US012483903B2

(12) United States Patent
Bar-Or Tillinger et al.

(10) Patent No.: US 12,483,903 B2
(45) Date of Patent: Nov. 25, 2025

(54) COARSE AND REFINED BEAM DETERMINATION FOR A SUB-TERAHERTZ BEAM PATH

(71) Applicant: QUALCOMM Incorporated, San Diego, CA (US)

(72) Inventors: Amit Bar-Or Tillinger, Tel-Aviv (IL); Michael Levitsky, Rehovot (IL); Assaf Touboul, Netanya (IL)

(73) Assignee: Qualcomm Incorporated, San Diego, CA (US)

( * ) Notice: Subject to any disclaimer, the term of this patent is extended or adjusted under 35 U.S.C. 154(b) by 475 days.

(21) Appl. No.: 17/932,590

(22) Filed: Sep. 15, 2022

(65) Prior Publication Data

US 2024/0098518 A1 Mar. 21, 2024

(51) Int. Cl.
*H04W 16/28* (2009.01)
*H04W 56/00* (2009.01)
*H04W 84/04* (2009.01)

(52) U.S. Cl.
CPC ....... *H04W 16/28* (2013.01); *H04W 56/0015* (2013.01); *H04W 84/047* (2013.01)

(58) Field of Classification Search
CPC .. H04B 7/026; H04B 7/0404; H04B 7/06958; H04B 7/0696; H04B 7/088; H04B 7/15528; H04W 16/28; H04W 56/0015; H04W 84/047
See application file for complete search history.

(56) References Cited

U.S. PATENT DOCUMENTS

| | | | |
|---|---|---|---|
| 9,445,389 B1* | 9/2016 | Kullman | H04W 64/003 |
| 2016/0353271 A1 | 12/2016 | Stephenne et al. | |
| 2019/0158162 A1* | 5/2019 | Ryu | H04B 7/088 |
| 2021/0075474 A1* | 3/2021 | Raghavan | H04B 7/0417 |
| 2021/0126694 A1* | 4/2021 | Abedini | H04W 24/10 |
| 2022/0141677 A1* | 5/2022 | Bai | H04B 7/0626 370/329 |
| 2024/0284195 A1* | 8/2024 | Zhang | H04W 84/047 |

FOREIGN PATENT DOCUMENTS

| | | |
|---|---|---|
| CN | 113746520 A | 12/2021 |
| WO | 2022186815 A1 | 9/2022 |

OTHER PUBLICATIONS

International Search Report and Written Opinion—PCT/US2023/029661—ISA/EPO—Feb. 23, 2024.
Partial International Search Report—PCT/US2023/029661—ISA/EPO—Nov. 24, 2023.

\* cited by examiner

*Primary Examiner* — Nguyen T Vo
(74) *Attorney, Agent, or Firm* — Procopio, Cory, Hargreaves & Savitch LLP

(57) ABSTRACT

A network node may transmit, using a first set of beams, coarse beam information for a second set of beams associated with a user equipment (UE) and a set of repeaters. The UE and the set of repeaters may receive, using the first set of beams, the coarse beam information for the second set of beams associated with the UE and the set of repeaters. The UE and the set of repeaters may transmit refined beam information for the second set of beams associated with the set of repeaters and the UE. The network node may receive, using the first set of beams, the refined beam information for the second set of beams associated with the set of repeaters and the UE.

30 Claims, 12 Drawing Sheets

COARSE AND REFINED BEAM DETERMINATION FOR A SUB-TERAHERTZ BEAM PATH

TECHNICAL FIELD

The present disclosure relates generally to communication systems, and more particularly, to a network node that communicates with a user equipment via a plurality of bands via a plurality of paths.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may be configured to receive, using a first set of beams, coarse beam information for a second set of beams associated with a set of repeaters and a network node. The apparatus may be configured to transmit refined beam information for the second set of beams associated with the set of repeaters and the network node.

In an aspect of the disclosure, a method, a computer-readable medium, and an apparatus at a repeater are provided. The apparatus may be configured to receive, using a first set of beams, coarse beam information for a second set of beams associated with a UE and a network node or with the UE, the network node, and a set of repeaters. The apparatus may be configured to transmit refined beam information for the second set of beams associated with the UE and the network node or with the UE, the network node, and the set of repeaters.

In an aspect of the disclosure, a method, a computer-readable medium, and an apparatus at a network node are provided. The apparatus may be configured to transmit, using a first set of beams, coarse beam information for a second set of beams associated with a UE and a set of repeaters. The apparatus may be configured to receive, using the first set of beams, refined beam information for the second set of beams associated with the set of repeaters and the UE.

To the accomplishment of the foregoing and related ends, the one or more aspects include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
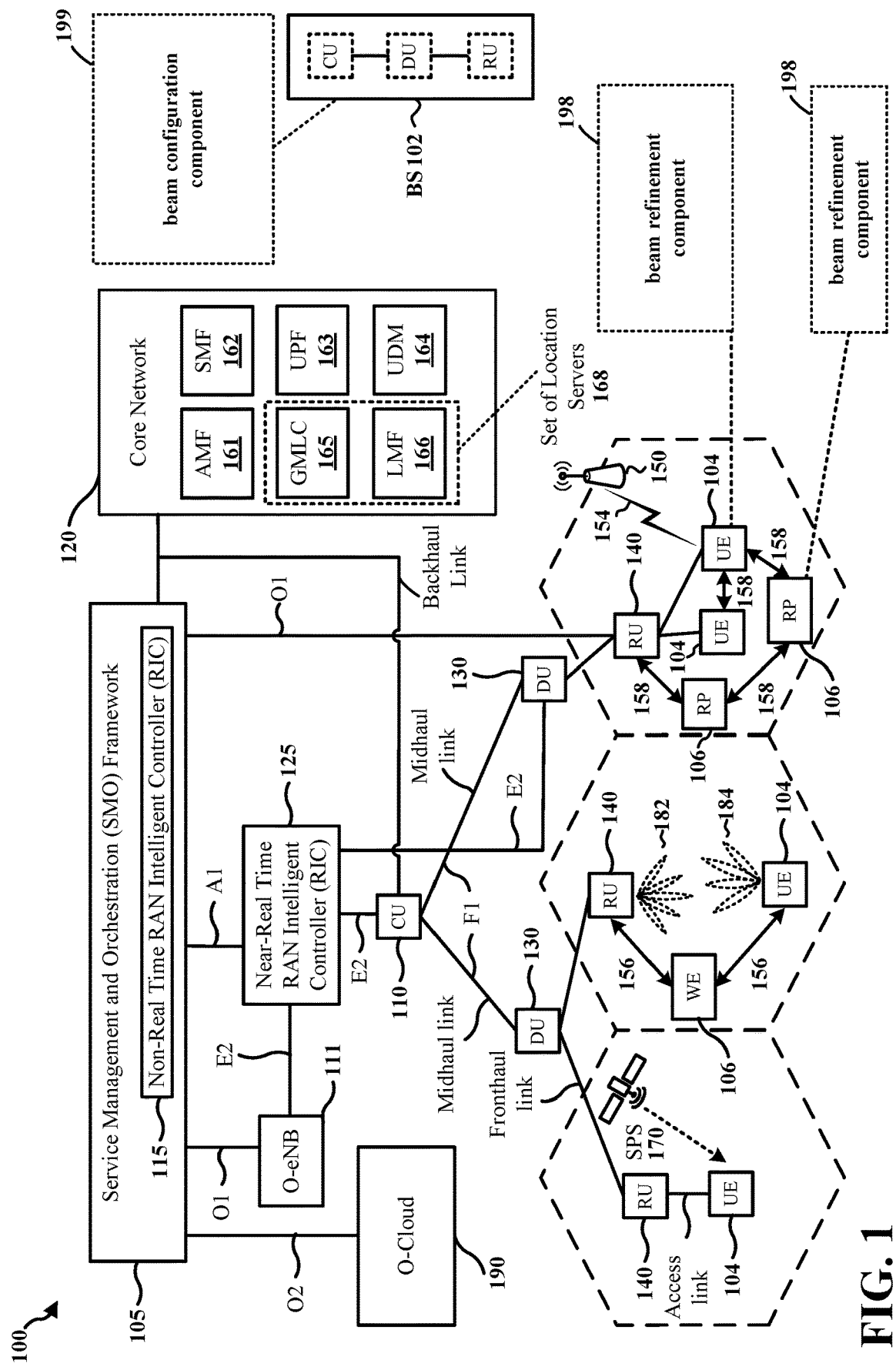
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media may include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

A repeater 106 may be a wireless device configured to repeat or extend a wireless signal received by the repeater, for example an access point (AP) or a reflector. For example, the repeater 106 may receive an incident wave from the base station 102 or the RU 140 of the base station 102 and repeat that incident wave to the UE 104, or may receive an incident wave from a UE 104 and repeat that incident wave to the base station 102 or the RU 140 of the base station 102. In one aspect, the repeater 106 may be configured to repeat a signal between an RU 140 and a UE 104 using a D2D communication link 158. In another aspect, the repeater 106 may be configured to repeat a signal between an RU 140 and a UE 104 using an air interface link 156.

Referring again to FIG. 1, in certain aspects, the UE 104 may have a beam refinement component 198 configured to receive, using a first set of beams, coarse beam information for a second set of beams associated with a set of repeaters and a network node. The beam refinement component 198 may be configured to transmit refined beam information for the second set of beams associated with the set of repeaters and the network node. In certain aspects, the repeater 106 may have a beam refinement component 198 configured to receive, using a first set of beams, coarse beam information for a second set of beams associated with a set of repeaters and a network node. The beam refinement component 198 may be configured to transmit refined beam information for the second set of beams associated with the set of repeaters and the network node. In certain aspects, the base station 102 may have a beam configuration component 199 configured to transmit, using a first set of beams, coarse beam information for a second set of beams associated with a UE and a set of repeaters. The beam configuration component 199 may be configured to receive, using the first set of beams, refined beam information for the second set of beams associated with the set of repeaters and the UE. Although the following description may be focused on repeaters and access points, the concepts described herein may be applicable to any repeaters configured to repeat a wireless signal transmitted to the repeater. Although the following description may be focused on 5G NR, the concepts described herein may be applicable to other similar areas, such as LTE, LTE-A, CDMA, GSM, and other wireless technologies.

Figure 2:
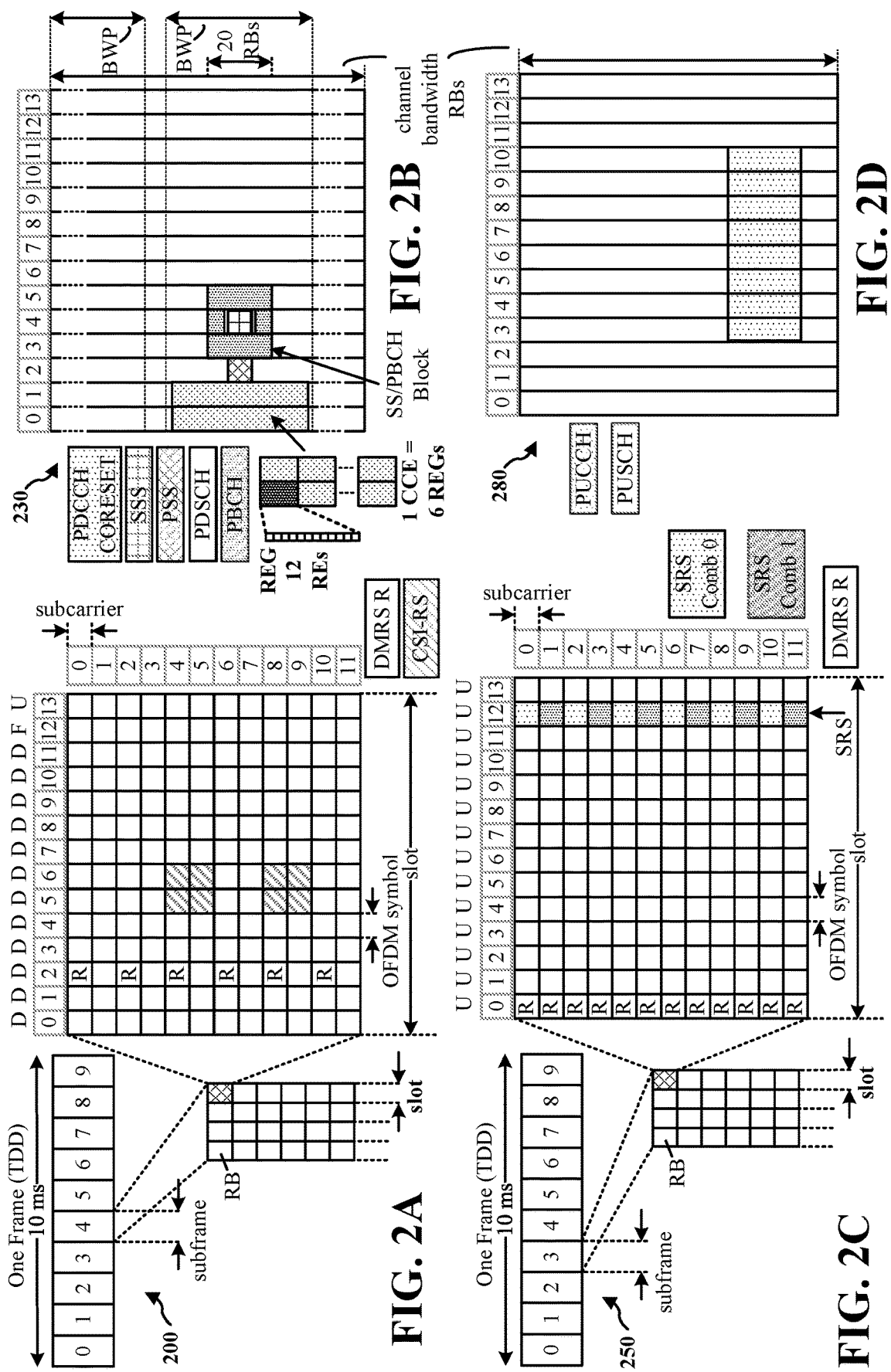
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
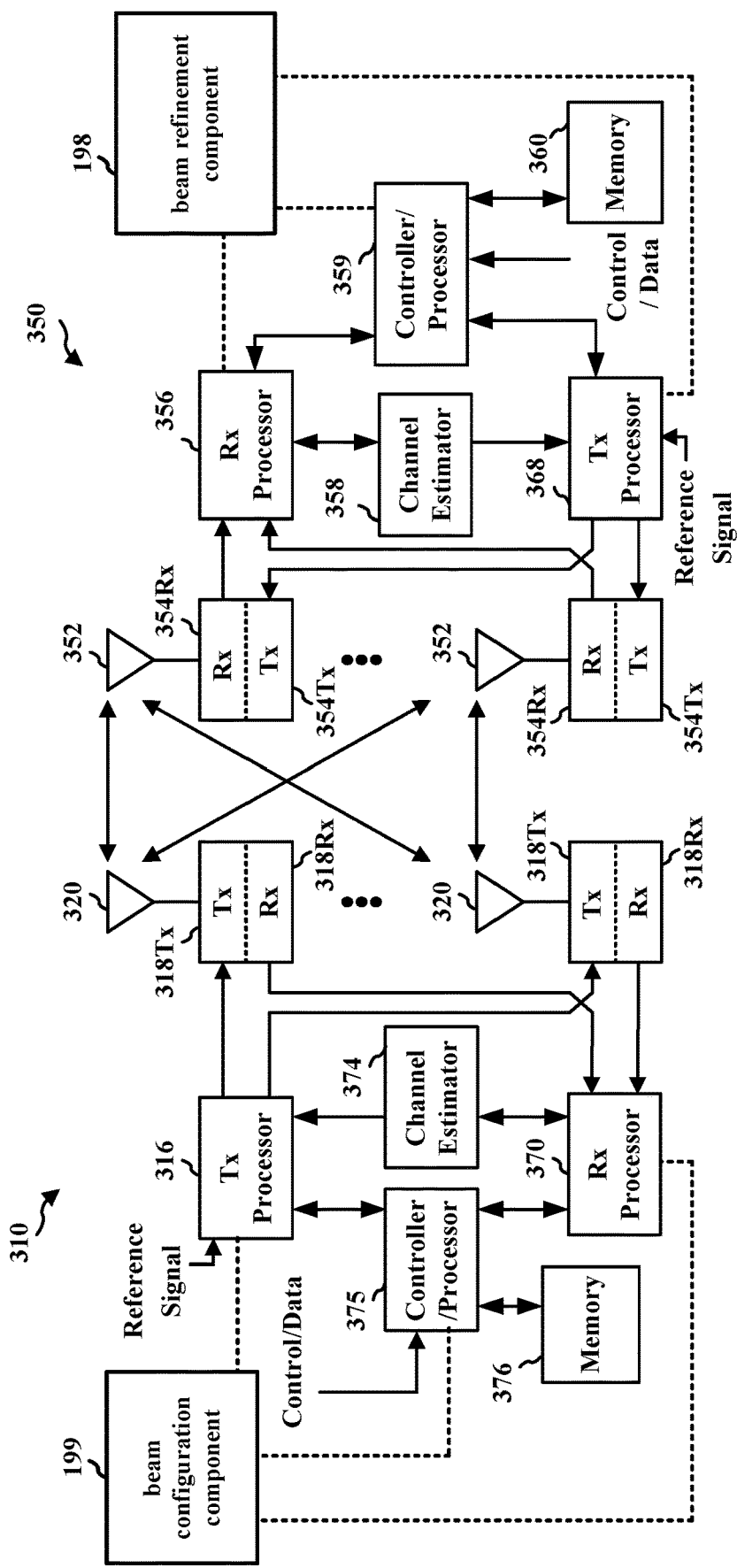
FIG. 3 is a diagram illustrating an example of a base station and a wireless device in an access network.

FIG. 3 is a block diagram of a base station 310 in communication with a wireless device 350 in an access network. The wireless device 350 may be, for example, the UE 104 or the repeater 106 in FIG. 1. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (Tx) processor 316 and the receive (Rx) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the wireless device 350. Each spatial stream may then be provided to a different antenna 320 via a separate transmitter 318Tx. Each transmitter 318Tx may modulate a radio frequency (RF) carrier with a respective spatial stream for transmission.

At the wireless device 350, each receiver 354Rx receives a signal through its respective antenna 352. Each receiver 354Rx recovers information modulated onto an RF carrier and provides the information to the receive (Rx) processor 356. The Tx processor 368 and the Rx processor 356 implement layer 1 functionality associated with various signal processing functions. The Rx processor 356 may perform spatial processing on the information to recover any spatial streams destined for the wireless device 350. If multiple spatial streams are destined for the wireless device 350, they may be combined by the Rx processor 356 into a single OFDM symbol stream. The Rx processor 356 then converts the OFDM symbol stream from the time-domain to the frequency domain using a Fast Fourier Transform (FFT). The frequency domain signal may include a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the Tx processor 368 to select the appropriate coding and modulation schemes, and to facilitate spatial processing. The spatial streams generated by the Tx processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the wireless device 350. Each receiver 318Rx receives a signal through its respective antenna 320. Each receiver 318Rx recovers information modulated onto an RF carrier and provides the information to a Rx processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the Tx processor 368, the Rx processor 356, and the controller/processor 359 may be configured to perform aspects in connection with the beam refinement component 198 of FIG. 1.

At least one of the Tx processor 316, the Rx processor 370, and the controller/processor 375 may be configured to perform aspects in connection with the beam configuration component 199 of FIG. 1.

Figure 4:
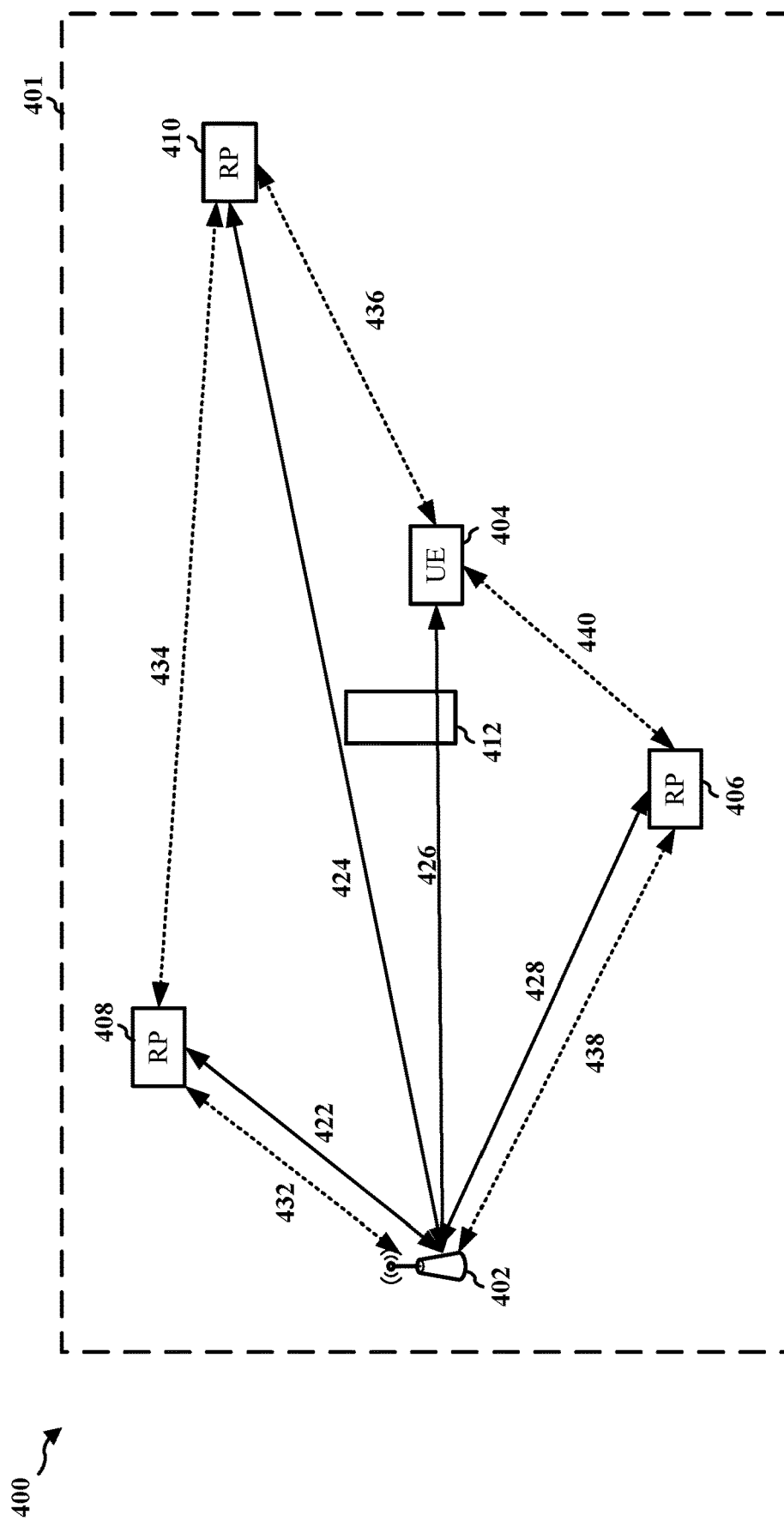
FIG. 4 is a diagram illustrating an example of a network node configured to communicate directly with a UE using a first set of beams and indirectly with the UE using a second set of beams and a set of repeaters, in accordance with various aspects of the present disclosure.

FIG. 4 is a diagram 400 illustrating an example of a network node 402 configured to communicate directly with a UE 404 using a first set of beams 452 and indirectly with the UE 404 using a second set of beams 454 via repeaters. The first set of beams may include resources in a first frequency range (FR). The second set of beams may include resources in a second FR different from the first FR. The first FR and the second FR may be non-overlapping. In one aspect, the first set of beams 452 may include a primary cell (Pcell) link that may be able to penetrate through a thin block, such as the block 412. The first set of beams 452 may include millimeter wave (mmw) bands. In one aspect, the second set of beams 454 may include a sub-terahertz (Sub-Thz) link that may not be able to penetrate through the thin block, such as the block 412.

The second set of beams 454 may have different characteristics than the first set of beams 452. In one aspect, the second set of beams 454 may have limited maximum power amplifier (PA) output power characteristics as compared with the first set of beams 452. For example, the second set of beams 454 may have 10 dB less power compared to the first set of beams 452. The second set of beams 454 may have a higher signal bandwidth (BW) than the first set of beams 452, which may result in an effective isotropic radiated power (EIRP) deficit as compared to the first set of beams 452. The second set of beams 454 may have a limited coverage that can be achieved as compared to the first set of beams 452. In one aspect, the second set of beams 454 may have about two to three times lower range than the first set of beams 452. The second set of beams 454 may have at least a factor two reduction in PA efficiency as compared to the PA efficiency of the first set of beams 452. As a result, the second set of beams 454 may have a poor power and/or energy efficiency as compared with the first set of beams 452. The second set of beams 454 may have poor penetration characteristics as compared with the first set of beams 452. In other words, the second set of beams 454 may not penetrate through barriers, such as the block 412, as easily as the first set of beams 452. As a result, the second set of beams 454 may have a stronger reliance on line of sight (LOS) links for deployment than the first set of beams 452. The second set of beams 454 may have a higher power consumption for transmission and/or reception of signals as compared with the first set of beams 452. The second set of beams 454 may have a higher signal bandwidth than the first set of beams 452. The second set of beams 454 may have a higher targeted data rate than the first set of beams 452. The second set of beams 454 may have a higher subcarrier spacing (SCS) than the first set of beams 452. In some aspects, the second set of beams 454 may have at least eight times higher SCS than the first set of beams 452. The second set of beams 454 may have less power efficient RF processing as compared to the first set of beams 452. The second set of beams 454 may have at least one of a higher power consumption related to analog to digital (A2D) and/or digital to analog (D2A) components that have increased sampling rates, a higher rate of digital processing, a high bit rate to be addressed on a decoder side, a higher memory and/or storage, more intermediate buffers, and/or a higher related power consumption as compared to the first set of beams 452.

While the UE 404 may not be able to communicate directly with the network node 402 using the second set of beams 454, the UE 404 may communicate indirectly with the network node via one or more repeaters. In one aspect, the UE may be able to communicate with the network node via the repeater 406 using a link 440 between the UE 404 and the repeater 406, and a link 438 between the repeater 406 and the network node 402. In another aspect, the UE may be able to communicate with the network node via the repeater 408 and the repeater 410 using a link 436 between the UE 404 and the repeater 410, the link 434 between the repeater 410 and the repeater 408, and the link 432 between the repeater 408 and the network node 402.

One of the challenges related to activating such indirect paths using the second set of beams 454 may be to reduce the complexity and the latency of the synchronization and beam management (BM). In other words, a naïve procedure which scans all beam pairs (e.g., Tx and Rx) may have a high complexity and a high latency—particularly if the second set of beams 454 has a higher frequency than the first set of beams 452. Moreover, the number of antenna elements of a panel configured to transmit and receive signals of the second set of beams 454 may be greater than a number of antenna elements of a panel configured to transmit and receive signals for the first set of beams 452. In other words, the second set of beams 454 may be narrower and more numerous than the first set of beams 452. As a result, the number of optional beam pairs a naïve procedure may use to measure latency of synchronization and BM for the second set of beams pairs may be larger than the naïve procedure used for the first set of beams pairs.

In some aspects, the network node 402 may be configured to use the knowledge of the locations of the UE 404 and the repeaters 406, 408, and 410 to perform a ray tracking analysis and to estimate a coarse beam direction, per hop, for activating the second set of beams 454. In some aspects, the network node 402 may be configured to also use topologic knowledge of the zone 401 to perform the ray tracking analysis. Using such a mechanism may reduce the amount of beam pairs to be scanned, which may result in a reduction of power consumption and latency, and may also allow a dynamic SubThz/Scell link activation/deactivation for power efficient Sub-Thz deployment.

In one aspect, the network node 402 may be configured to communicate directly with each of the UE 404, the repeater 406, the repeater 408, and the repeater 410 using the first set of beams 452. Specifically, the network node 402 may communicate directly with the UE 404 using the link 426, the network node 402 may communicate directly with the repeater 406 using the link 428, the network node 402 may communicate directly with the repeater 408 using the link 422, and the network node 402 may communicate directly with the repeater 410 using the link 424. However, the network node 402 may not communicate directly with the UE 404 because of the block 412. The network node 402 may be configured to perform a ray tracing analysis to estimate a coarse beam direction to configure a multi-hop deployment between the UE 404 and the network node 402. A multi-hop deployment may be a configuration that allows for an indirect path between the network node 402 and the UE 404 to be formed using a plurality of hops via wireless entities. In one aspect, a path between the UE 404 and the network node 402 may be formed using the second set of beams 454 with a first hop via the link 438 between the network node 402 and the repeater 406, and a second hop via the link 440 between the repeater 406 and the UE 404. In another aspect, a path between the UE 404 and the network node 402 may be formed using the second set of beams 454 with a first hop via the link 432 between the network node 402 and the repeater 408, a second hop via the link 434 between the repeater 408 and the repeater 410, and a third hop via the link 436 between the repeater 410 and the UE 404.

In one aspect, the network node 402 may determine location information of the UE 404 and any repeaters in the zone 401 that the network node 402 may use to configure a multi-hop deployment. The network node 402 may determine location information using any suitable means, for example by receiving location information from a memory of the network node 402, by receiving location information from an LMF, or by receiving location information directly from the UE 404 and/or the repeaters 406, 408, and 410. In some aspects, the location information may be based on a GPS or GNSS procedure. In other aspects, the location information may be based on positioning reference signals, such as sounding reference signals (RS) and measurements of such reference signals.

The network node 402 may use the location information and a topographic map of the zone 401 to perform a ray tracing analysis to identify LOS directions over hopes to be used as coarse beam directions, per hop, for a multi-hop SubThz link/Scell activation. In other words, the network node 402 may dispose location information of each of the network node 402, the UE 404, the repeater 406, the repeater 408, and the repeater 410 on a topographic map of the zone 401. The network node 402 may then identify LOS paths between any two of the wireless devices in the zone 401 with respect to the second set of beams 454, to determine possible paths between the network node 402 and the UE 404. A LOS path with respect to a set of beams may be one that the set of beams may use to transmit data between wireless devices. For example, the network node 402 may identify a LOS path between the network node 402 and the UE 404 with respect to the first set of beams 452 since the first set of beams 452 may penetrate through the block 412, but may not identify a LOS path between the network node 402 and the UE 404 with respect to the second set of beams 454 if the second set of beams 454 may not penetrate through the block 412. Here, the network node 402 may identify a LOS path between the network node 402 and the repeater 408, a LOS path between the repeater 408 and the repeater 410, a LOS path between the repeater 410 and the UE 404, a LOS path between the network node 402 and the repeater 406, and a LOS path between the repeater 406 and the UE 404.

Each component in the zone 401, such as the UE 404, the repeater 406, the repeater 408, and the repeater 410, may indicate or report over a Pcell link to the network node 402 its sub-terahertz (SubThz) beam width, angular direction, granularity, or a beam vocabulary. The beam vocabulary may be dependent upon antenna array parameters. In one aspect, the beam vocabulary may be a DFT based codebook, or a two-dimensional (2D) DFT based codebook. Such a report may be used by the network node 402 to configure SSB mini burst parameters. In other words, such a report may be used to configure a specific set of Tx beams to be swept around the coarse Tx beam direction, a number of Tx beams to be swept, or a number of SSB mini-burst repetitions aligned with the required number of Rx beams to be tested on the Rx side around the coarse Rx beam directions.

The network node 402 may signal coarse beam information to RPs and/or APs and a UE over a Pcell link. The network node 402 may indicate coarse Tx and Rx beams to each of the different components, such as the UE 404 and the repeaters 406, 408, and 410. For example, the network node 402 may signal coarse beam information to the repeater 408 over the link 422, the network node 402 may signal coarse beam information to the repeater 410 over the link 424, the network node 402 may signal coarse beam information to the repeater 406 over the link 428, and the network node 402 may signal coarse beam information to the UE 404 over the link 426. The coarse beam information may be used to initiate and/or configure a multiple hop specific session of synchronization and BM (e.g., beam refinement) using customized per hop SSB mini bursts for synchronization and BM of all multi-hop link components. Such configuration may be done in a sequential way across all hops, for example via a progressive synchronization method. A multi-hop specific synchronization and BM session may be initiated by the network node 402. Each session may be customized to sync a different component to a multi-hop link, such as a network node to an RP, an RP to an AP, and an AP to a UE. Based on a ray tracing analysis and its accuracy characteristics (e.g., estimated coarse beam mismatch range), the network node 402 may indicate to each of the repeaters 406, 408, and 410 which Tx beam identifiers (IDs) to scan during each relevant SSB mini-burst.

The network node 402 may configure SSB mini-burst parameters for each synchronization and BM session for each hop. In one aspect, the number of Tx beams and Rx beams to be scanned in each session may be determined based on (a) the component type (e.g., hop edge units), (b) whether the wireless device has a fixed location (e.g., an AP or RP fixed in place) or whether the wireless device is a nomadic device (e.g., a UE in a user's pocket). (c) the indications of the Rx/Tx beam characteristics that were received from the wireless device, (d) whether this is an installation or a boot up procedure for the wireless device, (e) whether the current synchronization and BM session is the first one for the current SubThz link activation or a repetitive synchronization session, (f) the time gap from the last synchronization on this hop, or (g) the ray tracing analysis accuracy.

The network node 402 may initiate a plurality of synchronization and BM sessions by configuring a hop between components to be synchronized at each session with customized SubThz SSB mini-burst parameters. For example, the synchronization and BM sessions may be progressive in time across different hops of a multi-hop SubThz link from the network node 402 to the UE 404 in a DL direction. In one aspect, the network node 402 may schedule at least one of a time of synchronization and BM session for Tx and Rx sides of a hop, identify a burst length of the session, identify the burst beams, and indicate a number of repetitions of the burst. The configuration may be provided over a Pcell link. The scheduling time may be provided referring to the Pcell timing as a coarse timing reference for localized in-time SSB detection on an Scell. As a result, the time uncertainty range may be small.

The mini-burst may be repeated a plurality of times with a small time gap in between the bursts to allow for localized in-time fast sweeping of a plurality of Tx and Rx beams around the coarse Tx and Rx beam direction for Scell/SubThz. Such a configuration may allow for low latency and/or low complexity Scell synchronization and BM recover per SubThz link activation. After a plurality of SSB mini-burst repetitions for a specific hop, a refined SubThz serving beam (Tx and Rx) may be determined per hop.

The UE 404 may signal the refined beam directions to the network node 402 over a Pcell link. For example, the UE 404 may signal the refined beam directions for the link 436 to the network node 402 via the link 426, or may signal the refined beam directions for the link 440 to the network node 402 via the link 426. In one aspect, the network node 402 may use the refined beam directions to control an AP Tx beam for an AP to UE hop during a SubThz data transmission. The network node 402 may update a database with the refined beam directions which associates a UE location and the coarse beam directions on the AP side. Such a database may be used to improve the ray tracing analysis. For example, if the network node 402 is configured to communicate with a second UE using the second set of beams 454 at the location of UE 404, the network node 402 may be configured to retrieve the refined beam directions for the UE 404 to improve the ray tracing analysis of the second UE.

Figure 5:
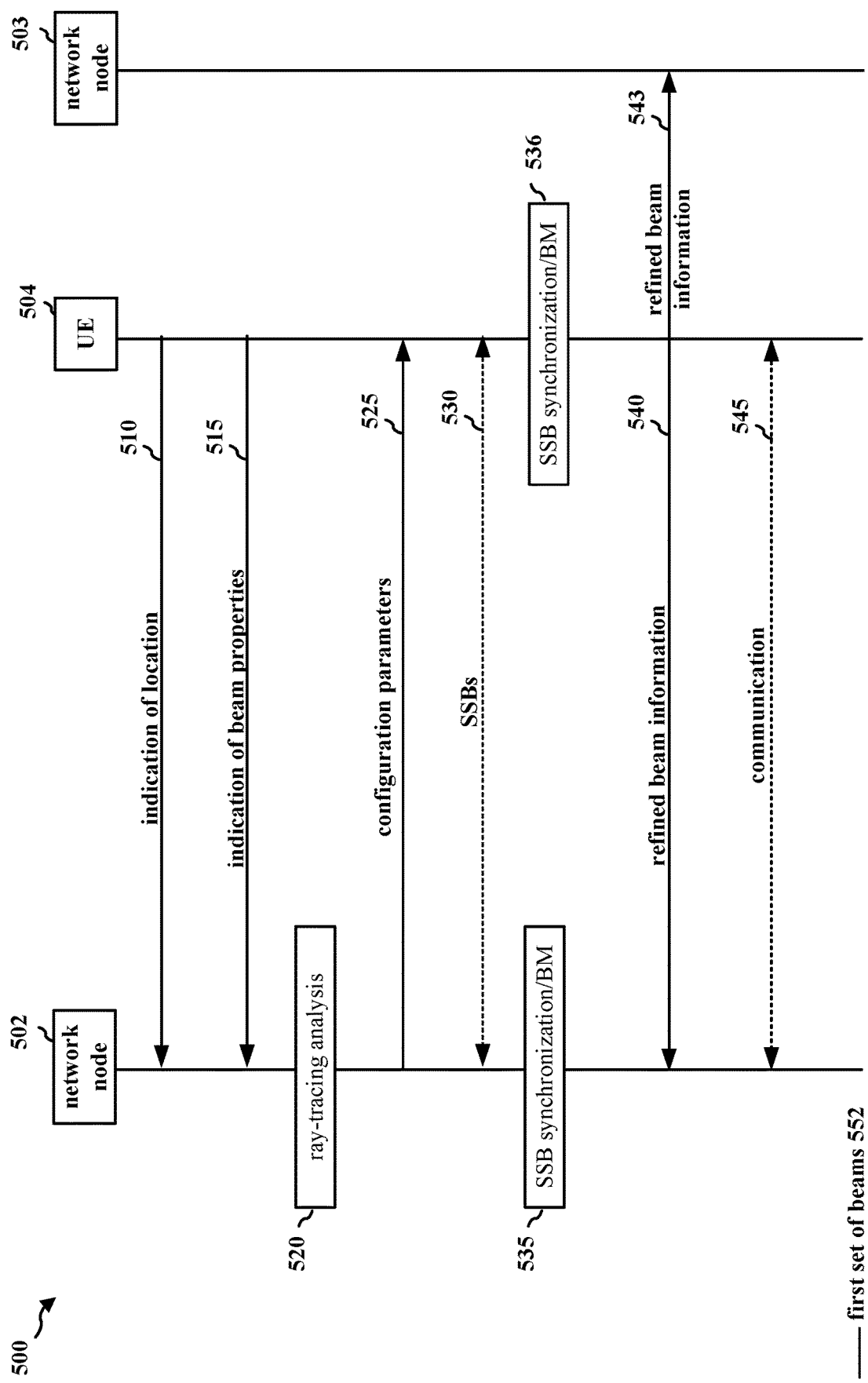
FIG. 5 is a communication flow diagram illustrating an example of a network node configured to communicate with a UE directly using a first set of beams and directly a second set of beams.

FIG. 5 is a communication flow diagram 500 illustrating an example of a network node 502 configured to communicate with a UE 504 directly using a first set of beams 552 and directly using a second set of beams 554.

The UE 504 may transmit an indication 510 of location to the network node 502. The network node 502 may receive the indication 510 of location from the UE 504. The indication 510 of location may be, for example, a location determined by a GPS procedure or a GNSS fix, or may be a reference signal, such as an SRS, that the network node 502 may use to determine a location of the UE 504. In some aspects, the network node 502 may retrieve a location of the UE 504 from an LMF.

The UE 504 may transmit an indication 515 of beam properties to the network node 502. The network node 502 may receive the indication 515 of beam properties from the UE 504. The beam properties may include, for example, at least one of a beam width, an angular direction, a granularity, or a beam vocabulary for each beam of the second set of beams 554 that the UE 504 is capable of transmitting or receiving. The indication 515 may be transmitted in a report, such as a UE capability report of the UE 504.

At 520, the network node 502 may perform a ray-tracing analysis to derive coarse beam information for the second set of beams 554 between the network node 502 and the UE 504. The network node 502 may generate a topographic map of a zone containing the network node 502 and the UE 504 based on location information of the network node 502 and the UE 504. The ray-tracing analysis may identify LOS or reflected LOS directions over all hops to be used as coarse beam directions with respect to the second set of beams 554. The ray-tracing analysis may identify a LOS path between the network node 502 and the UE 504 with respect to the second set of beams 554.

The network node 502 may determine SSB mini-burst parameters for a set of SSB synchronization and BM sessions between the network node 502 and the UE 504. The network node 502 may determine the SSB mini-burst parameters based on the indication 515 of beam properties received from the UE 504. The SSB mini-burst parameters may include at least one of an indication of a set of Tx beams associated with each Tx coarse beam of a set of Tx coarse beams associated with the second set of beams 554, a number of Tx beams associated with each Tx coarse beam of the set of Tx coarse beams, or a number of SSB repetitions. The number of SSB repetitions may equal a number of Rx beams associated with each Rx coarse beam of a set or Rx coarse beams associated with the second set of beams 554.

The number of Tx and Rx beams to be scanned in each session may be determined based on at least one of a set of attributes of the components associated with a hop, for example the hop between the network node 502 and the UE 504. The number of Tx and Rx beams to be scanned in each session may be determined based on an indicator of a component type (e.g., a hop edge unit or a hop non-edge unit), whether the component is a fixed or nomadic device, a characteristic of Tx/Rx beams associated with the device, whether the session is part of an installation or a boot up procedure, an indicator of the SSB synchronization session type (e.g., first one or a repetitive sync session), a time gap since a previous SSB synchronization session, or a ray tracing analysis history.

The network node 502 may transmit the configuration parameters 525 to the UE 504. The UE 504 may receive the configuration parameters 525 from the network node 502. In some aspects, the configuration parameters 525 may include a plurality of signals, where each signal may be transmitted at different times, for example different slots or different symbols. For example, the configuration parameters 525 may include a first signal having coarse beam information (e.g., an indication of a coarse beam), and a second signal having a set of SSB parameters (e.g., SSB mini burst parameters). The coarse beam information may indicate a coarse spatial direction to direct a beam during synchronization. The network node 502 and the UE 504 may use the coarse beam information to select a set of beams to scan during a synchronization session. The set of SSB parameters may include a configuration for at least one SSB synchronization session for each hop on a path between the UE 504 and the network node 502 via one or more repeaters. The set of SSB parameters may include parameters of an SSB mini burst signal, such as a scheduling time of a synchronization and BM session for transmission and reception sides of the hop, a burst length, an indication of burst beams, and/or a number of repetitions of the burst.

The UE 504 may apply coarse beam information from the configuration parameters 525 to sweep a set of beams as the SSBs 530 around a coarse beam direction in accordance with a configuration in the coarse beam information. The network node 502 may also apply coarse beam information to sweep a set of beams as the SSBs 530 around a coarse beam direction in accordance with a configuration in the coarse beam information from the configuration parameters 525.

At 535, the network node 502 may perform an SSB synchronization and BM process for each repeated session to refine the Tx or the Rx serving beam for the set of the second set of beams 554 between the network node 502 and the UE 504. At 536, the UE 504 may perform an SSB synchronization and BM process for each repeated session to refine the Tx or the Rx serving beam for the set of the second set of beams 554 between the network node 502 and the UE 504. The UE 504 may transmit the refined beam information 540 to the network node 502. The network node 502 may be a Pcell for the UE 504. The network node 502 may receive the refined beam information 540 from the UE 504. The UE 504 may transmit the refined beam information 543 to another network node 503. The network node 503 may be an Scell for the UE 504. The network node 503 may receive the refined beam information 543 from the UE 504. The network node 503 may transmit the refined beam information 543 to the network node 502, or to any other cell configured to serve the UE 504. In one aspect, the refined beam information 540 and/or 543 may indicate a selected direction for the second set of beams 554. In another aspect, the refined beam information may indicate a set of metrics for each direction that the second set of beams 554 may be transmitted, for example towards a first repeater in a first direction or towards a second repeater in a second direction.

The network node 502 and the UE 504 may exchange communication 545 signals with one another using the refined beam information 540 of the second set of beams 554. The proposed mechanism reduces both the power consumption and the latency of deriving the beam directions of the second set of beams 554.

Figure 6:
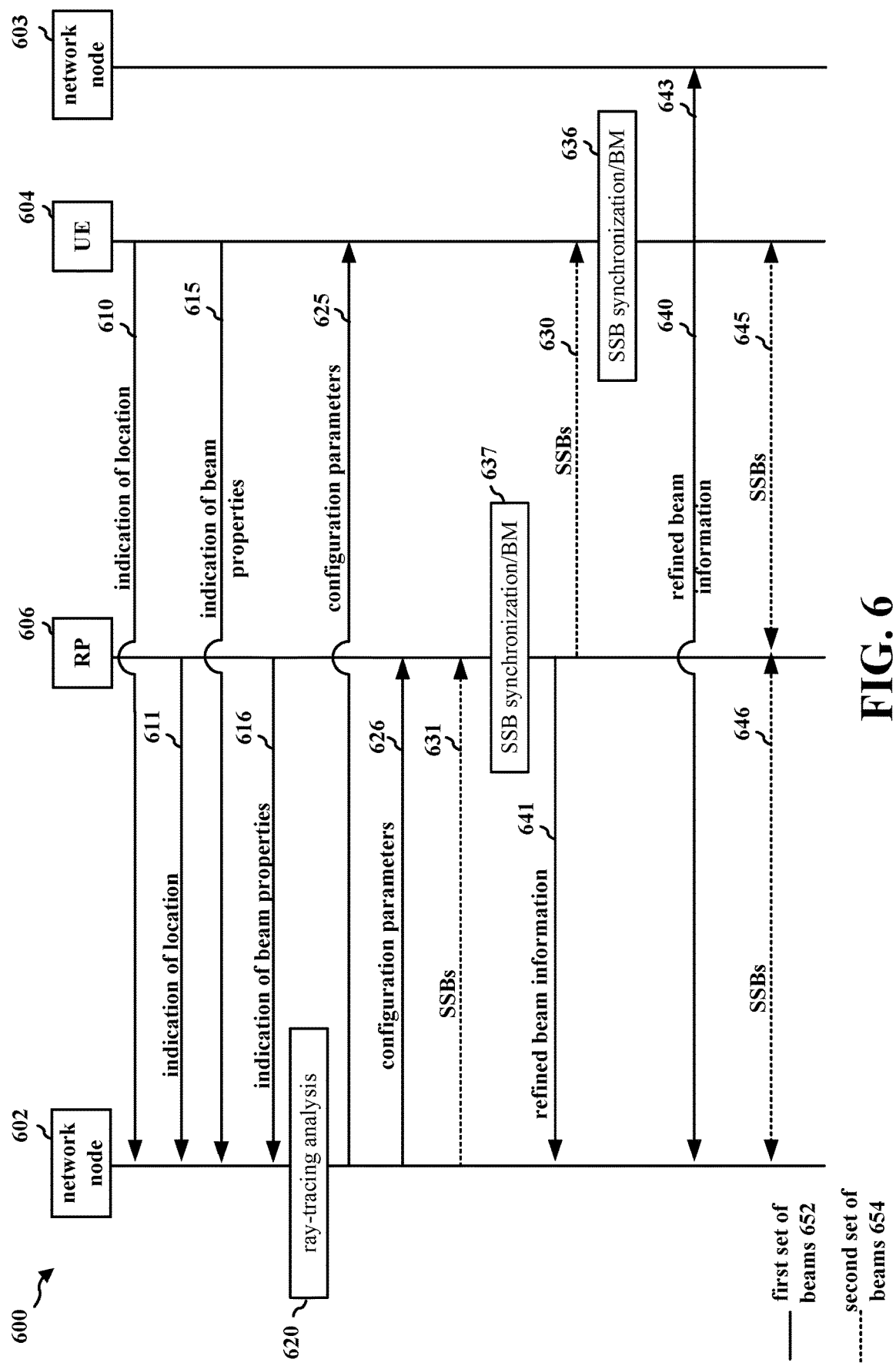
FIG. 6 is a communication flow diagram illustrating an example of a network node configured to communicate with a UE directly using a first set of beams and indirectly a second set of beams.

FIG. 6 is a communication flow diagram 600 illustrating an example of a network node 602 configured to communicate with a UE 604 directly using a first set of beams 652 and indirectly using a second set of beams 654 via the repeater 606.

The UE 604 may transmit an indication 610 of location to the network node 602. The network node 602 may receive the indication 610 of location from the UE 604. The repeater 606 may transmit an indication 611 of location to the network node 602. The network node 602 may receive the indication 611 of location from the repeater 606. The indication 610 of location or the indication 611 of location may be, for example, a location determined by a GPS procedure or a GNSS fix, or may be a reference signal, such as an SRS, that the network node 602 may use to determine a location of the UE 604 or the repeater 606. In some aspects, the network node 602 may retrieve a location of the UE 604 or the repeater 606 from an LMF.

The UE 604 may transmit an indication 615 of beam properties to the network node 602. The network node 602 may receive the indication 615 of beam properties from the UE 604. The repeater 606 may transmit an indication 616 of beam properties to the network node 602. The network node 602 may receive the indication 616 of beam properties from the repeater 606. The beam properties may include, for example, at least one of a beam width, an angular direction, a granularity, or a beam vocabulary for each beam of the second set of beams 654 that the UE 604 or the repeater 606, respectively, is capable of transmitting or receiving. The indication 615 or the indication 616 may be transmitted in a report, such as a UE capability report of the UE 604 or a repeater capability report of the repeater 606, respectively.

At 620, the network node 602 may perform a ray-tracing analysis to derive coarse beam information for the second set of beams 654 between the network node 602 the repeater 606, and the UE 604. The network node 602 may generate a topographic map of a zone containing the network node 602 and the UE 604 based on location information of the network node 602 and the UE 604, which may include any repeaters in wireless communication range of the network node 602 or the UE 604. The ray-tracing analysis may identify LOS or reflected LOS directions over all hops to be used as coarse beam directions with respect to the second set of beams 654. The ray-tracing analysis may identify a LOS path between the network node 602 and the repeater 606, and between the UE 604 and the repeater 606 with respect to the second set of beams 654.

The network node 602 may determine SSB mini-burst parameters for a set of SSB synchronization and BM sessions between the network node 602, the repeater 606, and the UE 604. The network node 602 may determine the SSB mini-burst parameters based on the indication 615 of beam properties received from the UE 604 and the indication 616 of beam properties received from the repeater 606. The SSB mini-burst parameters may include at least one of an indication of a set of Tx beams associated with each Tx coarse beam of a set of Tx coarse beams associated with the second set of beams 654, a number of Tx beams associated with each Tx coarse beam of the set of Tx coarse beams, or a number of SSB repetitions. The number of SSB repetitions may equal a number of Rx beams associated with each Rx coarse beam of a set or Rx coarse beams associated with the second set of beams 654.

The number of Tx and Rx beams to be scanned in each session may be determined based on at least one of a set of attributes of the components associated with a hop, for example the hop between the network node 602 and the repeater 606, or the hop between the repeater 606 and the UE 604. The number of Tx and Rx beams to be scanned in each session may be determined based on an indicator of a component type (e.g., a hop edge unit or a hop non-edge unit), whether the component is a fixed or nomadic device, a characteristic of Tx/Rx beams associated with the device, whether the session is part of an installation or a boot up procedure, an indicator of the SSB synchronization session type (e.g., first one or a repetitive sync session), a time gap since a previous SSB synchronization session, or a ray tracing analysis history.

The network node 602 may transmit the configuration parameters 625 to the UE 604. The UE 604 may receive the configuration parameters 625 from the network node 602. The network node 602 may transmit the configuration parameters 626 to the repeater 606. The repeater 606 may receive the configuration parameters 626 from the network node 602. In some aspects, the configuration parameters 625 and/or the configuration parameters 626 may each include a plurality of signals, where each signal may be transmitted at different times, for example different slots or different symbols. For example, the configuration parameters 625 or configuration parameters 626 may include a first signal having coarse beam information (e.g., an indication of a coarse beam), and a second signal having a set of SSB parameters (e.g., SSB mini burst parameters. The coarse beam information may indicate a coarse spatial direction to direct a beam during a synchronization session. For example, the coarse beam information in the configuration parameters 626 may indicate a first direction and a second direction for the repeater 606. The first direction may be a coarse reception beam direction for a synchronization session between the network node 602 and the repeater 606 where the repeater 606 is in reception mode. The second direction may be a coarse transmission beam direction for a synchronization session between the repeater 606 and the UE 604 where the repeater 606 is in transmission mode. In another example, the coarse beam information in the configuration parameters 625 may indicate a coarse reception beam direction for a synchronization session between the repeater 606 and the UE 604 where the UE 604 is in reception mode. In other words, a wireless device that receives coarse beam information may use the coarse beam information to select the set of beams which the wireless device will scan during a relevant synchronization session. The set of SSB parameters may include a configuration for at least one SSB synchronization session for each hop on a path between the UE 604 and the network node 602 via one or more repeaters, such as the repeater 606. The set of SSB parameters may include parameters of an SSB mini burst signal, such as a scheduling time of a synchronization and BM session for transmission and reception sides of the hop, a burst length, an indication of burst beams, and/or a number of repetitions of the burst.

The network node 602 may apply coarse beam information to sweep a set of beams as the SSBs 631 around a coarse beam direction in accordance with a configuration in the coarse beam information in the configuration parameters 626. The repeater 606 may apply coarse beam information from the configuration parameters 626 to sweep a set of beams as the SSBs 631 around a coarse beam direction in accordance with a configuration in the coarse beam information. The network node 602 may transmit the SSBs 631 to the repeater 606. The repeater 606 may receive the SSBs 631 from the network node 602.

At 637, the repeater 606 may perform an SSB synchronization and BM process for each repeated session to refine the Tx or the Rx serving beam for the set of the second set of beams 654 between the repeater 606 and the network node 602 and/or between the repeater 606 and the UE 604.

The repeater 606 may transmit the refined beam information 641 to the network node 602. The network node 602 may receive the refined beam information 641 from the repeater 606. In one aspect, the refined beam information 641 may indicate a selected direction for the second set of beams 654. In another aspect, the refined beam information 641 may indicate a set of metrics for each direction that the second set of beams 654 may be transmitted, for example a first set of metrics towards a first repeater in a first direction and a second set of metrics towards a second repeater in a second direction.

The repeater 606 may apply the coarse beam information from the configuration parameters 626 to sweep a set of beams as the SSBs 630 around a coarse beam direction in accordance with a configuration in the configuration parameters 626. The UE 604 may apply the coarse beam information from the configuration parameters 625 to sweep a set of beams as the SSBs 630 around a coarse beam direction in accordance with a configuration in the coarse beam information. The repeater 606 may transmit the SSBs 630 to the UE 604. The UE 604 may receive the SSBs 630 from the repeater 606.

At 636, the UE 604 may perform an SSB synchronization and BM process for each repeated session to refine the Tx or the Rx serving beam for the set of the second set of beams 654 between the repeater 606 and the UE 604. The UE 604 may perform the SSB synchronization and BM process at 636 after the repeater 606 performs its SSB synchronization and BM process at 637. The UE 604 may transmit the refined beam information 640 to the network node 602. The network node 602 may be a Pcell for the UE 504. The network node 602 may receive the refined beam information 640 from the UE 604. The UE 604 may transmit the refined beam information 643 to another network node 603. The network node 603 may be an Scell for the UE 604. The network node 603 may receive the refined beam information 643 from the UE 604. The network node 603 may transmit the refined beam information 643 to the network node 602, or to any other cell configured to serve the UE 604. In one aspect, the refined beam information 640 and/or 643 may indicate a selected direction for the second set of beams 654. In another aspect, the refined beam information 640 and/or 643 may indicate a set of metrics for each direction that the second set of beams 654 may be transmitted, for example towards a first repeater in a first direction or towards a second repeater in a second direction.

The UE 604 and the repeater 606 may exchange communication 645 signals with one another using the refined beam information 640 and the refined beam information 641 of the second set of beams 654. The network node 602 and the repeater 606 may exchange communication 646 signals with one another using the refined beam information 641 of the second set of beams 654. The proposed mechanism reduces both the power consumption and the latency of deriving the beam directions of the second set of beams 654.

In some aspects, in response to receiving the refined beam information 640 from the UE 604, the network node 602 may be configured to transmit the refined beam information to a second UE based on the second UE's location (e.g., the second UE may be within a threshold distance of a location of the first UE 604 when the first UE 604 performed the SSB synchronization and BM process at 636). In other words, the second UE may be located in a same area as the UE 604 when the first UE 604 performed the SSB synchronization and BM process at 636. The network node 602 may determine the location of the second UE from an LMF or by receiving a location of the second UE from the second UE. The second UE may use the refined beam information 640 to communicate with the network node 602 without needing to perform SSB synchronization or BM to communicate with the network node 602 using the second set of beams 654, as the configuration has already been performed between the network node 602 and the UE 604 when the UE 604 was located within a threshold distance from the second UE. While one repeater, repeater 606, is shown in the communication flow diagram 600, any number of repeaters may be between the network node 602 and the UE 604 to transmit the second set of beams 654.

Figure 7:
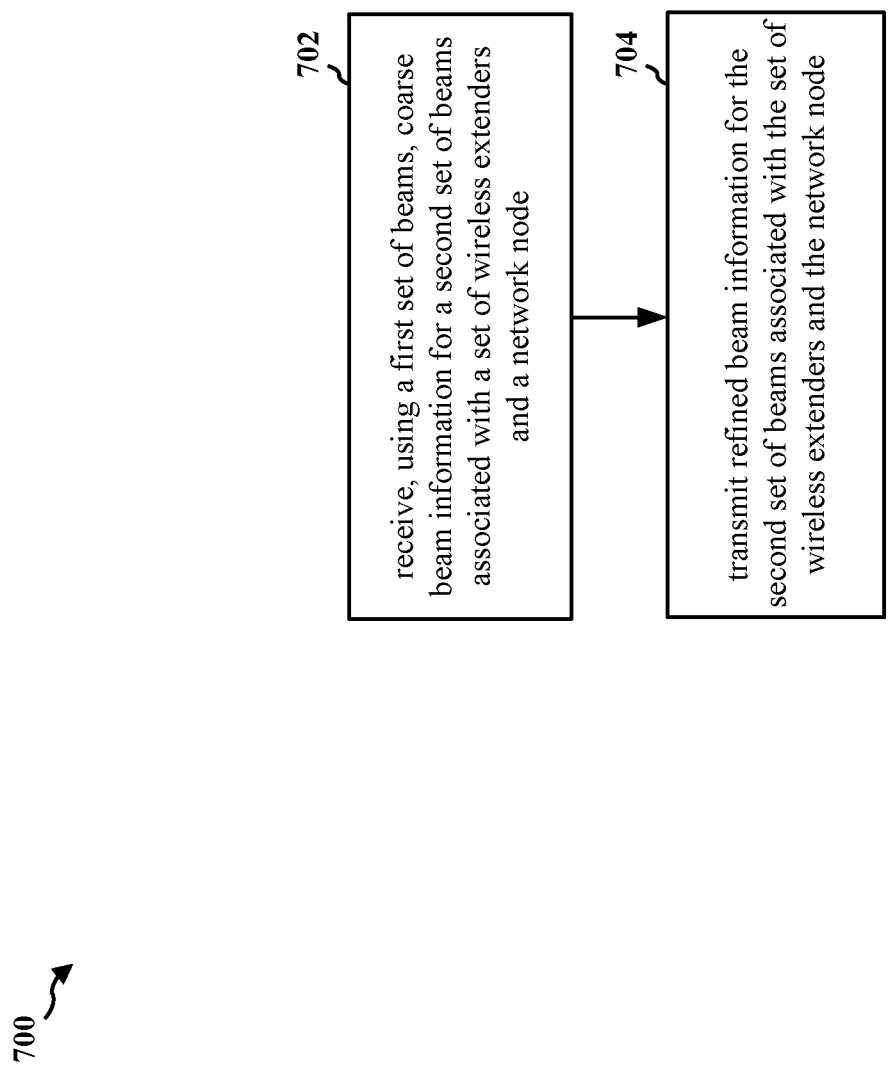
FIG. 7 is a flowchart of a method of wireless communication.

FIG. 7 is a flowchart 700 of a method of wireless communication. The method may be performed by a UE (e.g., the UE 104, the UE 404, the UE 504, the UE 604; the wireless device 350; the apparatus 1004). At 702, the UE may receive, using a first set of beams, coarse beam information for a second set of beams associated with a set of repeaters and a network node. For example, 702 may be performed by the component 198 in FIG. 10.

At 704, the UE may transmit refined beam information for the second set of beams associated with the set of repeaters and the network node. For example, 704 may be performed by the component 198 in FIG. 10.

Figure 8:
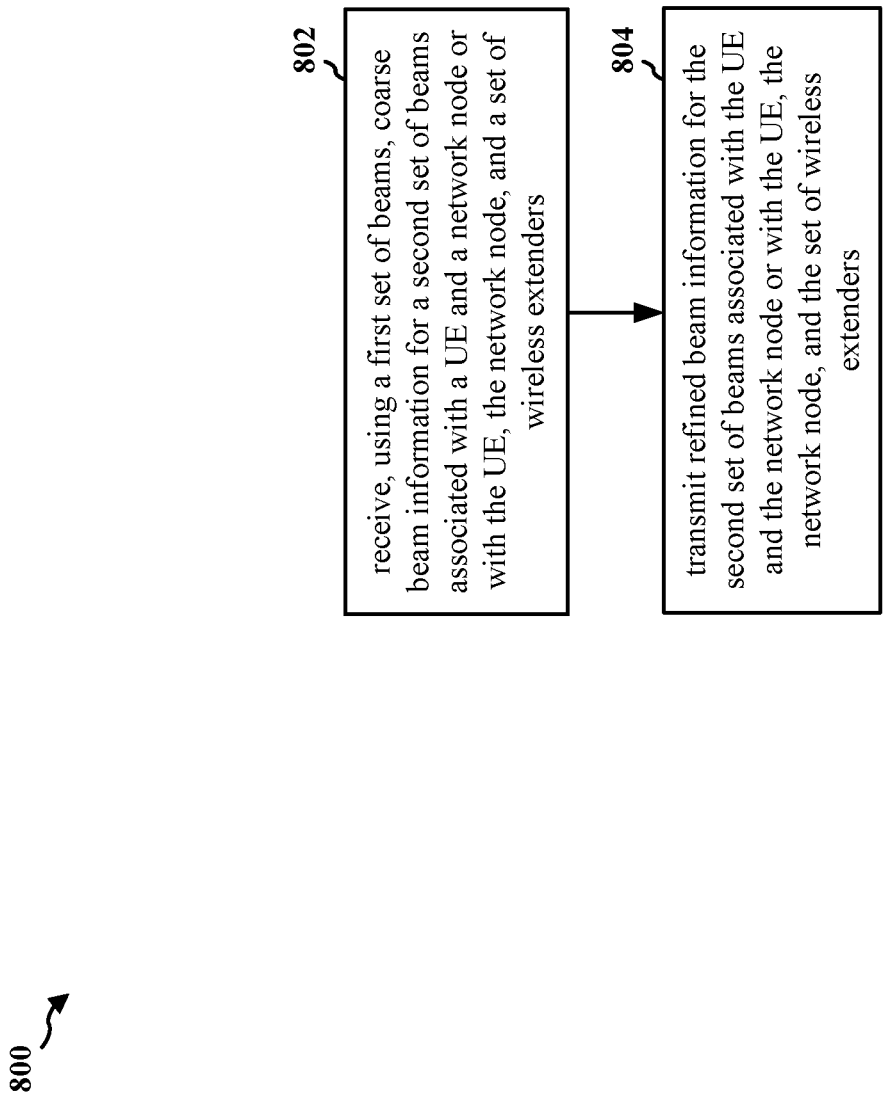
FIG. 8 is a flowchart of a method of wireless communication.

FIG. 8 is a flowchart 800 of a method of wireless communication. The method may be performed by a repeater (e.g., the repeater 106, the repeater 406, the repeater 408, the repeater 410, the repeater 606; the wireless device 350). At 802, the repeater may receive, using a first set of beams, coarse beam information for a second set of beams associated with a UE and a network node or with the UE, the network node, and a set of repeaters. For example, 802 may be performed by the component 198 in FIG. 3.

At 804, the repeater may transmit refined beam information for the second set of beams associated with the UE and the network node or with the UE, the network node, and the set of repeaters. For example, 804 may be performed by the component 198 in FIG. 3.

Figure 9:
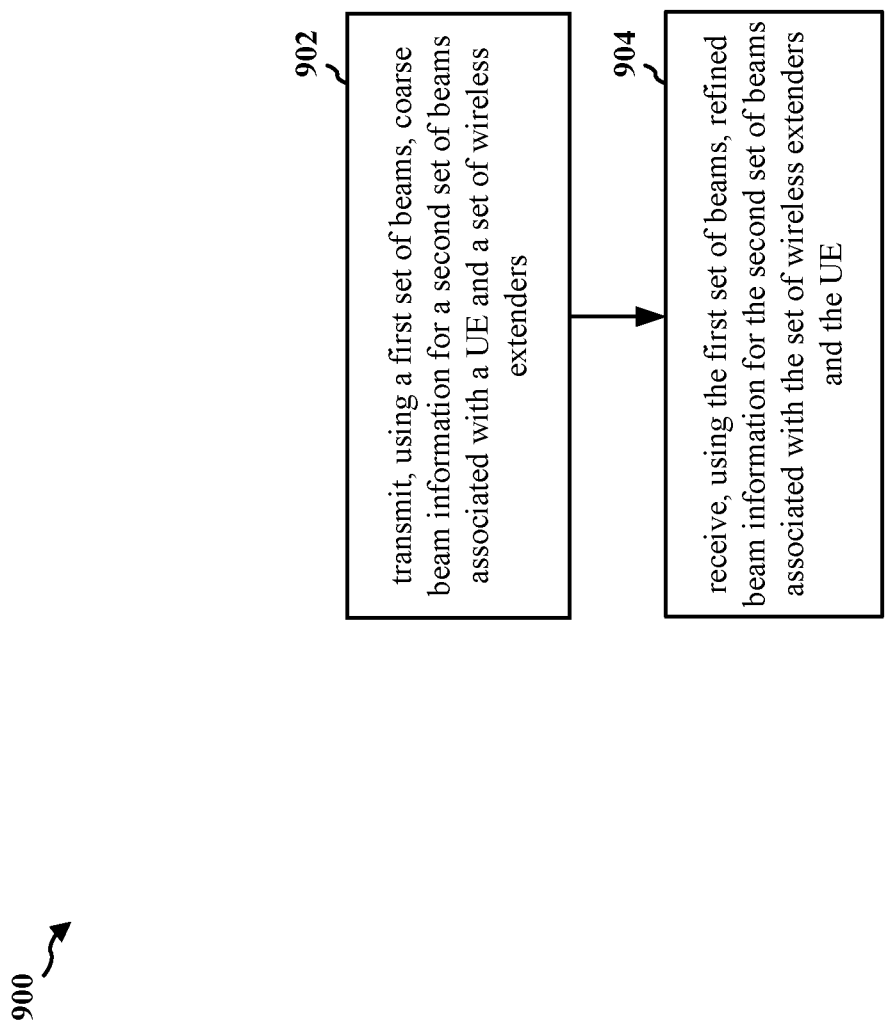
FIG. 9 is a flowchart of a method of wireless communication.

FIG. 9 is a flowchart 900 of a method of wireless communication. The method may be performed by a network node (e.g., the base station 102, the base station 310; the network node 402, the network node 502, the network node 602; the network entity 1002, the network entity 1102, the network entity 1260). At 902, the network node may transmit, using a first set of beams, coarse beam information for a second set of beams associated with a UE and a set of repeaters. For example, 902 may be performed by the component 199 in FIG. 11.

At 904, the network node may receive, using the first set of beams, refined beam information for the second set of beams associated with the set of repeaters and the UE. For example, 904 may be performed by the component 199 in FIG. 11.

Figure 10:
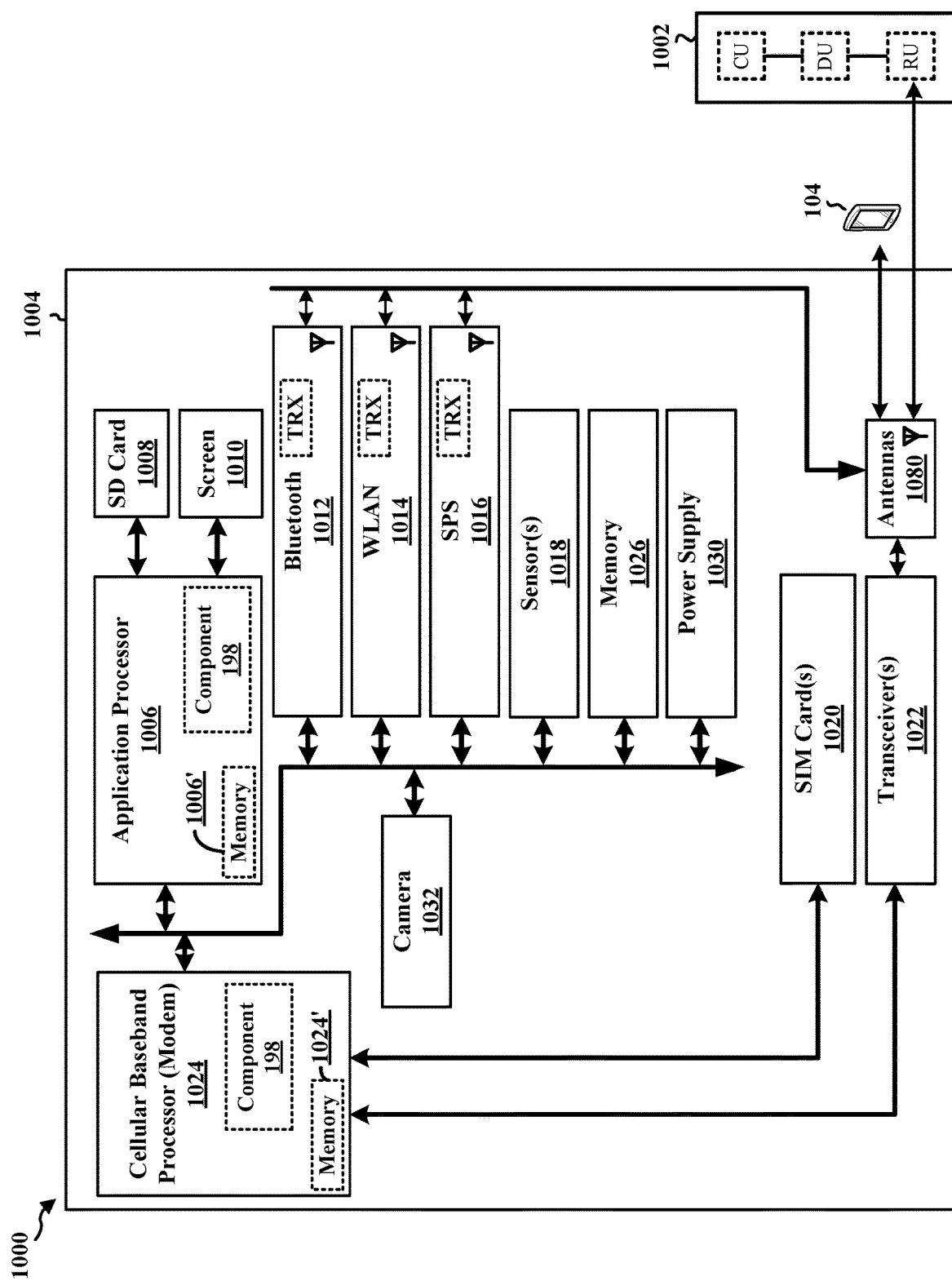
FIG. 10 is a diagram illustrating an example of a hardware implementation for an example apparatus and/or network entity.

FIG. 10 is a diagram 1000 illustrating an example of a hardware implementation for an apparatus 1004. The apparatus 1004 may be a UE, a component of a UE, or may implement UE functionality. In some aspects, the apparatus 1004 may include a cellular baseband processor 1024 (also referred to as a modem) coupled to one or more transceivers 1022 (e.g., cellular RF transceiver). The cellular baseband processor 1024 may include on-chip memory 1024'. In some aspects, the apparatus 1004 may further include one or more subscriber identity modules (SIM) cards 1020 and an application processor 1006 coupled to a secure digital (SD) card 1008 and a screen 1010. The application processor 1006 may include on-chip memory 1006'. In some aspects, the apparatus 1004 may further include a Bluetooth module 1012, a WLAN module 1014, an SPS module 1016 (e.g., GNSS module), one or more sensor modules 1018 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1026, a power supply 1030, and/or a camera 1032. The Bluetooth module 1012, the WLAN module 1014, and the SPS module 1016 may include an on-chip transceiver (TRX) (or in some cases, just a receiver). The Bluetooth module 1012, the WLAN module 1014, and the SPS module 1016 may include their own dedicated antennas and/or utilize the antennas 1080 for communication. The cellular baseband processor 1024 communicates through the transceiver(s) 1022 via one or more antennas 1080 with the UE 104 and/or with an RU associated with a network entity 1002. The cellular baseband processor 1024 and the application processor 1006 may each include a computer-readable medium/memory 1024', 1006', respectively. The additional memory modules 1026 may also be considered a computer-readable medium/memory. Each computer-readable medium/memory 1024', 1006', 1026 may be non-transitory. The cellular baseband processor 1024 and the application processor 1006 are each responsible for general processing, including the execution of software stored on the computer-readable medium/memory. The software, when executed by the cellular baseband processor 1024/application processor 1006, causes the cellular baseband processor 1024/application processor 1006 to perform the various functions described supra. The computer-readable medium/memory may also be used for storing data that is manipulated by the cellular baseband processor 1024/application processor 1006 when executing software. The cellular baseband processor 1024/application processor 1006 may be a component of the wireless device 350 and may include the memory 360 and/or at least one of the Tx processor 368, the Rx processor 356, and the controller/processor 359. In one configuration, the apparatus 1004 may be a processor chip (modem and/or application) and include just the cellular baseband processor 1024 and/or the application processor 1006, and in another configuration, the apparatus 1004 may be the entire UE (e.g., see wireless device 350 of FIG. 3) and include the additional modules of the apparatus 1004.

As discussed supra, the component 198 is configured to receive, using a first set of beams, coarse beam information for a second set of beams associated with a set of repeaters and a network node. The component 198 may be configured to transmit refined beam information for the second set of beams associated with the set of repeaters and the network node. The component 198 may be within the cellular baseband processor 1024, the application processor 1006, or both the cellular baseband processor 1024 and the application processor 1006. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1004 may include a variety of components configured for various functions. In one configuration, the apparatus 1004, and in particular the cellular baseband processor 1024 and/or the application processor 1006, includes means for receiving, using a first set of beams, coarse beam information for a second set of beams associated with a set of repeaters and a network node. The apparatus 1004 may include means for transmitting refined beam information for the second set of beams associated with the set of repeaters and the network node. The apparatus 1004 may include means for transmitting an indication of a location of the UE. The apparatus 1004 may include means for transmitting a first indication of at least one of a beam width, an angular direction, a granularity, or a beam vocabulary for each beam of the second set of beams. The means may be the component 198 of the apparatus 1004 configured to perform the functions recited by the means. As described supra, the apparatus 1004 may include the Tx processor 368, the Rx processor 356, and the controller/processor 359. As such, in one configuration, the means may be the Tx processor 368, the Rx processor 356, and/or the controller/processor 359 configured to perform the functions recited by the means.

Figure 11:
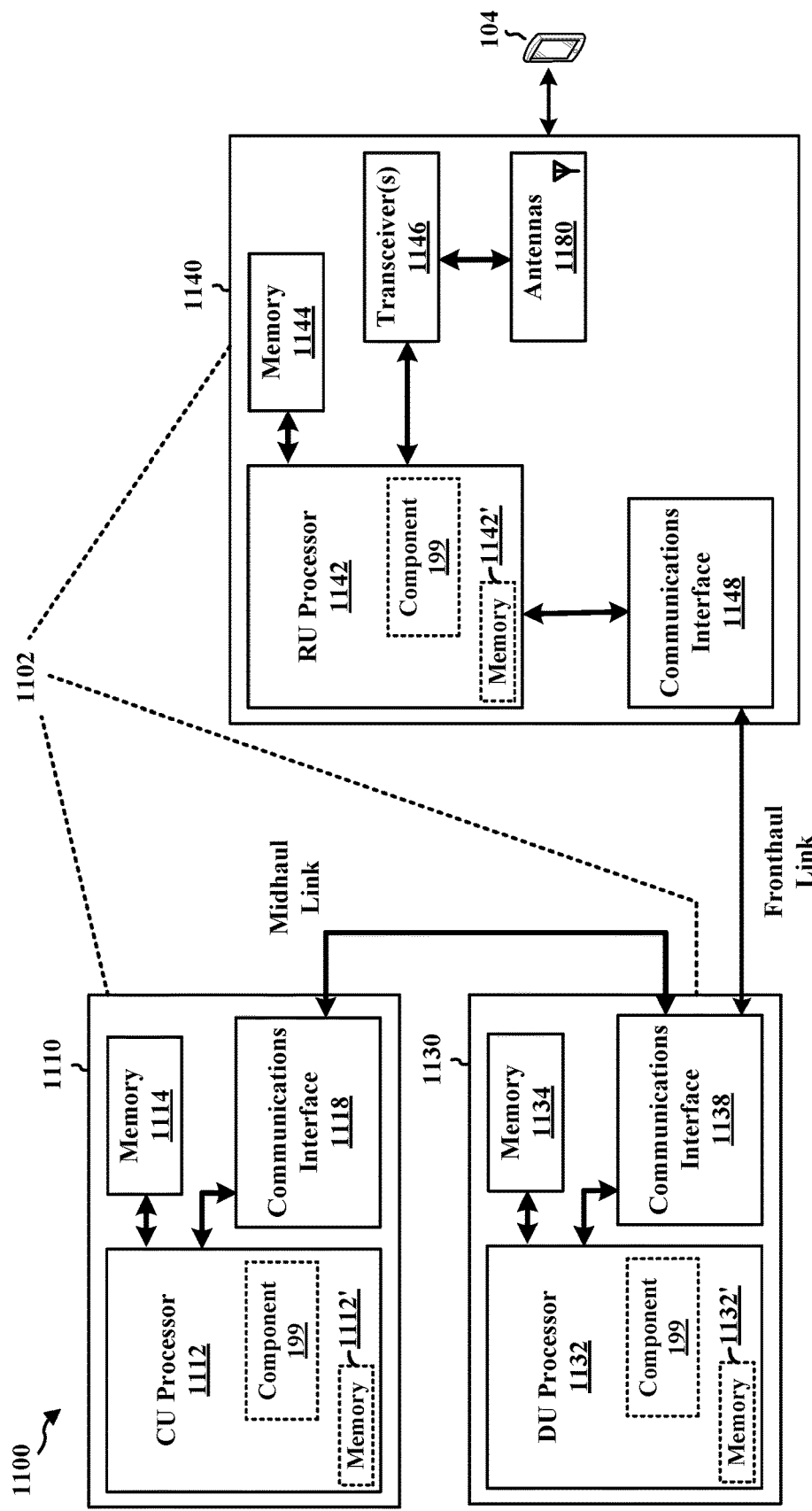
FIG. 11 is a diagram illustrating an example of a hardware implementation for an example network entity.

FIG. 11 is a diagram 1100 illustrating an example of a hardware implementation for a network entity 1102. The network entity 1102 may be a BS, a component of a BS, or may implement BS functionality. The network entity 1102 may include at least one of a CU 1110, a DU 1130, or an RU 1140. For example, depending on the layer functionality handled by the component 199, the network entity 1102 may include the CU 1110; both the CU 1110 and the DU 1130; each of the CU 1110, the DU 1130, and the RU 1140; the DU 1130; both the DU 1130 and the RU 1140; or the RU 1140. The CU 1110 may include a CU processor 1112. The CU processor 1112 may include on-chip memory 1112'. In some aspects, the CU 1110 may further include additional memory modules 1114 and a communications interface 1118. The CU 1110 communicates with the DU 1130 through a midhaul link, such as an F1 interface. The DU 1130 may include a DU processor 1132. The DU processor 1132 may include on-chip memory 1132'. In some aspects, the DU 1130 may further include additional memory modules 1134 and a communications interface 1138. The DU 1130 communicates with the RU 1140 through a fronthaul link. The RU 1140 may include an RU processor 1142. The RU processor 1142 may include on-chip memory 1142'. In some aspects, the RU 1140 may further include additional memory modules 1144, one or more transceivers 1146, antennas 1180, and a communications interface 1148. The RU 1140 communicates with the UE 104. The on-chip memory 1112', 1132', 1142' and the additional memory modules 1114, 1134, 1144 may each be considered a computer-readable medium/memory. Each computer-readable medium/memory may be non-transitory. Each of the processors 1112, 1132, 1142 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to transmit, using a first set of beams, coarse beam information for a second set of beams associated with a UE and a set of repeaters. The component 199 may be configured to receive, using the first set of beams, refined beam information for the second set of beams associated with the set of repeaters and the UE. The component 199 may be within one or more processors of one or more of the CU 1110, DU 1130, and the RU 1140. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1102 may include a variety of components configured for various functions. In one configuration, the network entity 1102 includes means for transmitting, using a first set of beams, coarse beam information for a second set of beams associated with a UE and a set of repeaters. The network entity 1102 may include means for receiving, using the first set of beams, refined beam information for the second set of beams associated with the set of repeaters and the UE. The network entity 1102 may include means for receiving a first indication of a location of the UE. The network entity 1102 may include means for receiving a second indication of a set of locations associated with the set of repeaters. The network entity 1102 may include means for performing a ray-tracing analysis to generate the coarse beam information based the first indication and the second indication. The network entity 1102 may include means for performing the ray-tracing analysis by populating a topographic map of a zone based on at least one of the first indication or the second indication. The network entity 1102 may include means for performing the ray-tracing analysis by identifying a set of line-of-sight directions between at least two of the network node, the UE, and the set of repeaters based on the first indication and the second indication. The network entity 1102 may include means for receiving a first indication of at least one of a beam width, an angular direction, a granularity, or a beam vocabulary for each beam of the second set of beams. The means may be the component 199 of the network entity 1102 configured to perform the functions recited by the means. As described supra, the network entity 1102 may include the Tx processor 316, the Rx processor 370, and the controller/processor 375. As such, in one configuration, the means may be the Tx processor 316, the Rx processor 370, and/or the controller/processor 375 configured to perform the functions recited by the means.

Figure 12:
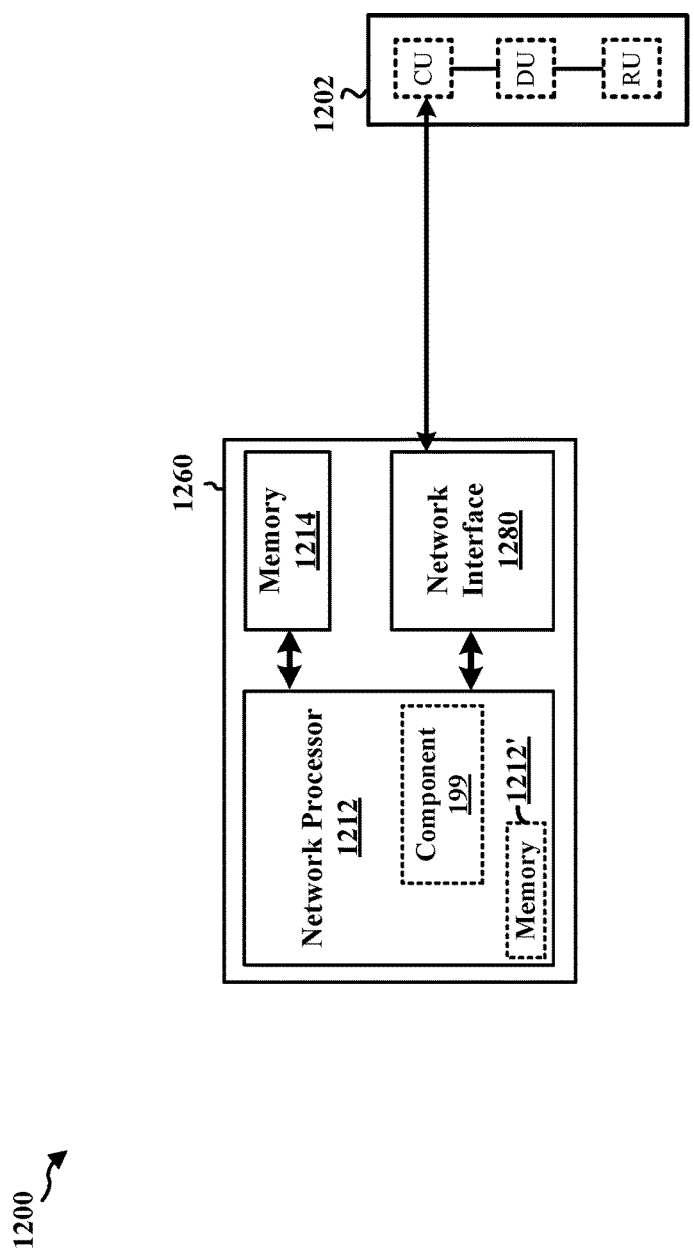
FIG. 12 is a diagram illustrating an example of a hardware implementation for an example network entity.

FIG. 12 is a diagram 1200 illustrating an example of a hardware implementation for a network entity 1260. In one example, the network entity 1260 may be within the core network 120. The network entity 1260 may include a network processor 1212. The network processor 1212 may include on-chip memory 1212'. In some aspects, the network entity 1260 may further include additional memory modules 1214. The network entity 1260 communicates via the network interface 1280 directly (e.g., backhaul link) or indirectly (e.g., through a RIC) with the CU 1202. The on-chip memory 1212' and the additional memory modules 1214 may each be considered a computer-readable medium/memory. Each computer-readable medium/memory may be non-transitory. The processor 1212 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to transmit, using a first set of beams, coarse beam information for a second set of beams associated with a UE and a set of repeaters. The component 199 may be configured to receive, using the first set of beams, refined beam information for the second set of beams associated with the set of repeaters and the UE. The component 199 may be within the processor 1212. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1260 may include a variety of components configured for various functions. In one configuration, the network entity 1260 includes means for transmitting, using a first set of beams, coarse beam information for a second set of beams associated with a UE and a set of repeaters. The network entity 1260 may include means for receiving, using the first set of beams, refined beam information for the second set of beams associated with the set of repeaters and the UE. The network entity 1260 may include means for receiving a first indication of a location of the UE. The network entity 1260 may include means for receiving a second indication of a set of locations associated with the set of repeaters. The network entity 1260 may include means for performing a ray-tracing analysis to generate the coarse beam information based the first indication and the second indication. The network entity 1260 may include means for performing the ray-tracing analysis by populating a topographic map of a zone based on at least one of the first indication or the second indication. The network entity 1260 may include means for performing the ray-tracing analysis by identifying a set of line-of-sight directions between at least two of the network node, the UE, and the set of repeaters based on the first indication and the second indication. The network entity 1260 may include means for receiving a first indication of at least one of a beam width, an angular direction, a granularity, or a beam vocabulary for each beam of the second set of beams. The means may be the component 199 of the network entity 1260 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if" "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data.

The following aspects are illustrative only and may be combined with other aspects or teachings described herein, without limitation.

Aspect 1 is a method of wireless communication at a UE, where the method may include receiving, using a first set of beams, coarse beam information for a second set of beams associated with a set of repeaters and a network node. The method may include transmitting refined beam information for the second set of beams associated with the set of repeaters and the network node.

Aspect 2 is the method of aspect 1, where the first set of beams may include a Pcell link. The first set of beams may include resources in a first FR and the second set of beams may include resources in a second FR different from the first FR.

Aspect 3 is the method of any of aspects 1 and 2, where the second set of beams may include a SubThz link.

Aspect 4 is the method of any of aspects 1 to 3, where the set of repeaters may include a set of APs.

Aspect 5 is the method of any of aspects 1 to 4, where the method may include transmitting an indication of a location of the UE. The coarse beam information may be based on the indication of the location of the UE.

Aspect 6 is the method of any of aspects 1 to 5, where the method may include receiving a configuration for at least one SSB synchronization session for each hop on a path between the UE and the network node via the set of repeaters.

Aspect 7 is the method aspect 6, where the method may include transmitting a first indication of at least one of a beam width, an angular direction, a granularity, or a beam vocabulary for each beam of the second set of beams. The configuration for the at least one SSB synchronization session may include, based on the first indication, at least one of (a) a second indication of a set of Tx beams associated with each Tx coarse beam of a set of Tx coarse beams, (b) a number of Tx beams associated with each Tx coarse beam of the set of Tx coarse beams, or (c) a number of SSB repetitions.

Aspect 8 is the method of aspect 7, where the number of SSB repetitions may equal a number of Rx beams associated with each Rx coarse beam of a set of Rx coarse beams.

Aspect 9 is the method of any of aspects 6 to 8, where the configuration of the at least one SSB synchronization session may include at least one of a scheduling time, a burst length, an indication of a set of burst beams, or a number of repetitions of a burst of SSB beams.

Aspect 10 is the method of aspect 9, where the scheduling time may be based on a Pcell timing schedule.

Aspect 11 is the method of any of aspects 1 to 10, where the coarse beam information may include an indication of a set of Rx beams and a set of Tx beams for each repeater of the set of repeaters, the network node, and the UE.

Aspect 12 is the method of any of aspects 1 to 11, where the refined beam information may include an indication of a beam direction associated with each beam of the second set of beams.

Aspect 13 is a method of wireless communication at a repeater, where the method may include receiving, using a first set of beams, coarse beam information for a second set of beams associated with a UE and a network node or with the UE, the network node, and a set of repeaters. The method may include transmitting refined beam information for the second set of beams associated with the UE and the network node or with the UE, the network node, and the set of repeaters.

Aspect 14 is the method of aspect 13, where the first set of beams may include a Pcell link Aspect 15 is the method of any of aspects 13 and 4, where the second set of beams may include a SubThz link.

Aspect 16 is the method of any of aspects 13 to 15, where the set of repeaters may include at least one of a set of RPs or a set of APs.

Aspect 17 the method of any of aspects 13 to 16, where the method may include transmitting an indication of a location of the repeater. The coarse beam information may be based on the indication of the location of the repeater.

Aspect 18 is the method of any of aspects 13 to 17, where the coarse beam information may include a configuration for at least one SSB synchronization session for each hop on a path between the UE and the network node via the set of repeaters.

Aspect 19 is the method of aspect 18, where the method may include transmitting a first indication of at least one of a beam width, an angular direction, a granularity, or a beam vocabulary for each beam of the second set of beams. The configuration for the at least one SSB synchronization session may include, based on the first indication, at least one of (a) a second indication of a set of Tx beams associated with each Tx coarse beam of a set of Tx coarse beams, (b) a number of Tx beams associated with each Tx coarse beam of the set of Tx coarse beams, or (c) a number of SSB repetitions.

Aspect 20 is the method of aspect 19, where the number of SSB repetitions may equal a number of Rx beams associated with each Rx coarse beam of a set of Rx coarse beams.

Aspect 21 is the method of any of aspects 18 to 20, where the configuration for the at least one SSB synchronization session may include at least one of a scheduling time, a burst length, an indication of a set of burst beams, or a number of repetitions of a burst of SSB beams.

Aspect 22 is the method of aspect 21, where the scheduling time may be based on a Pcell timing schedule Aspect 23 is the method of any of aspects 13 to 22, where the coarse beam information may include an indication of a set of Rx beams and a set of Tx beams for the repeater, the network node, and the UE, or for the repeater, the network node, the UE, and each repeater of the set of repeaters.

Aspect 24 is the method of any of aspects 13 to 23, where the refined beam information may include an indication of a beam direction associated with each beam of the second set of beams.

Aspect 25 is a method of wireless communication at a network node, where the method may include transmitting, using a first set of beams, coarse beam information for a second set of beams associated with a UE and a set of repeaters. The method may include receiving, using the first set of beams, refined beam information for the second set of beams associated with the set of repeaters and the UE.

Aspect 26 is the method of aspect 25, where the first set of beams may include a Pcell link Aspect 27 is the method of any of aspects 25 and 26, where the second set of beams may include a SubThz link.

Aspect 28 is the method of any of aspects 25 to 27, where the set of repeaters may include at least one of a set of RPs or a set of APs.

Aspect 29 is the method of any of aspects 25 to 28, where the method may include receiving a first indication of a location of the UE. The method may include receiving a second indication of a set of locations associated with the set of repeaters. The method may include performing a ray-tracing analysis to generate the coarse beam information based the first indication and the second indication.

Aspect 30 is the method of any of aspect 29, where performing the ray-tracing analysis may include populating a topographic map of a zone based on at least one of the first indication or the second indication.

Aspect 31 is the method of any of aspects 29 to 30, where performing the ray-tracing analysis may include identifying a set of line-of-sight directions between at least two of the network node, the UE, and the set of repeaters based on the first indication and the second indication. The coarse beam information may include a set of coarse beams between the at least two of the network node, the UE, and the set of repeaters.

Aspect 32 is the method of any of aspects 25 to 31, where the method may include transmitting a configuration for at least one SSB synchronization session for each hop on a path between the UE and the network node via the set of repeaters.

Aspect 33 is the method of any of 32, where the method may include receiving a first indication of at least one of a beam width, an angular direction, a granularity, or a beam vocabulary for each beam of the second set of beams. The configuration for the at least one SSB synchronization session may include, based on the first indication, at least one of (a) a second indication of a set of Tx beams associated with each Tx coarse beam of a set of Tx coarse beams, (b) a number of Tx beams associated with each Tx coarse beam of the set of Tx coarse beams, or (c) a number of SSB repetitions.

Aspect 34 is the method of aspect 33, where the number of SSB repetitions may equal a number of Rx beams associated with each Rx coarse beam of a set of Rx coarse beams.

Aspect 35 is the method of any of aspects 32 to 34, where the configuration for the at least one SSB synchronization session may include at least one of a scheduling time, a burst length, an indication of a set of burst beams, or a number of repetitions of a burst of SSB beams.

Aspect 36 is the method of aspect 35, where the scheduling time may be based on a Pcell timing schedule.

Aspect 37 is the method of any of aspects 25 to 36, where a number of beams scanned during the at least one SSB synchronization session may be based on a set of attributes of at least one of the set of repeaters and the UE.

Aspect 38 is the method of aspect 37, where the set of attributes may include at least one of (a) a first indicator of a component type, (b) a second indicator of a fixed or nomadic device, (c) a third indicator of a characteristic of the second set of beams, (d) a fourth indicator of an installation or a boot up procedure, (e) a fifth indicator of a SSB synchronization session type, (f) a sixth indicator of a time gap since a previous SSB synchronization session, or (g) a seventh indicator of a ray tracing analysis accuracy.

Aspect 39 is the method of any of aspects 25 to 38, where the coarse beam information may include an indication of a set of Rx beams and a set of Tx beams for each repeater of the set of repeaters, the network node, and the UE.

Aspect 40 is the method of any of aspects 25 to 39, where the refined beam information may include an indication of a beam direction associated with each beam of the second set of beams.

Aspect 41 is an apparatus for wireless communication, including: a memory; and at least one processor coupled to the memory and, based at least in part on information stored in the memory, the at least one processor is configured to implement any of aspects 1 to 40.

Aspect 42 is the apparatus of aspect 41, further including at least one of an antenna or a transceiver coupled to the at least one processor.

Aspect 43 is an apparatus for wireless communication including means for implementing any of aspects 1 to 40.

Aspect 44 is a computer-readable medium (e.g., a non-transitory computer-readable medium) storing computer executable code, where the code when executed by a processor causes the processor to implement any of aspects 1 to 40.

What is claimed is:

1. An apparatus for wireless communication at a network node, comprising:
    memory; and
    at least one processor coupled to the memory and, based at least in part on information stored in the memory, the at least one processor is configured to:
        transmit, to at least one wireless device of a set of wireless devices via a first set of beams, a first indication of a set of coarse beam information for a second set of beams, wherein the set of wireless devices comprise a user equipment (UE) and a set of repeaters, wherein the first set of beams comprise a first set of resources in a first frequency range (FR) and the second set of beams comprise a second set of resources in a second FR, wherein the first FR and the second FR do not overlap;
        receive, from at least one wireless device of the set of wireless devices via the first set of beams, a second indication of a set of refined beam information for the second set of beams; and
        communicate, via at least one repeater of the set of repeaters, with the UE based on the received second indication of the set of refined beam information.

2. The apparatus of claim 1, wherein the at least one processor is further configured to:
    receive a third indication of a location of the UE;
    receive a fourth indication of a set of locations associated with the set of repeaters;
    perform a ray-tracing analysis based on the third indication of the location of the UE and the fourth indication of the set of locations associated with the set of repeaters; and
    generate the set of coarse beam information based on the performed ray-tracing analysis.

3. The apparatus of claim 2, wherein, to perform the ray-tracing analysis based on the third indication of the location of the UE and the fourth indication of the set of locations associated with the set of repeaters, the at least one processor is configured to:
    populate a topographic map of a zone based on at least one of the third indication of the location of the UE or the fourth indication of the set of locations associated with the set of repeaters.

4. The apparatus of claim 2, wherein, to perform the ray-tracing analysis based on the third indication of the location of the UE and the fourth indication of the set of locations associated with the set of repeaters, the at least one processor is configured to:
    identify a set of line-of-sight directions between at least two of the network node, the UE, and the set of repeaters based on the third indication of the location of the UE and the fourth indication of the set of locations associated with the set of repeaters, wherein the set of coarse beam information comprises a set of coarse beams between the at least two of the network node, the UE, and the set of repeaters.

5. The apparatus of claim 1, wherein the at least one processor is further configured to:
    transmit a configuration for at least one synchronization signal block (SSB) synchronization session for each hop on a path between the UE and the network node via the set of repeaters.

6. The apparatus of claim 5, further comprising a transceiver coupled to the at least one processor, wherein the at least one processor is further configured to:
    receive, using the transceiver, a third indication of at least one of a beam width, an angular direction, a granularity, or a beam vocabulary for each beam of the second set of beams, wherein the configuration of the at least one SSB synchronization session comprises, based on the first third indication, at least one of:
        a fourth indication of set of transmit (Tx) beams associated with each Tx coarse beam of a set of Tx coarse beams;
        a first number of Tx beams associated with each Tx coarse beam of the set of Tx coarse beams; or
        a second number of SSB repetitions, wherein the second number of SSB repetitions equals a number of receive (Rx) beams associated with each Rx coarse beam of a set of Rx coarse beams.

7. The apparatus of claim 6, wherein the second number of SSB repetitions is equal to a third number of receive (Rx) beams associated with each Rx coarse beam of the set of Rx coarse beams.

8. The apparatus of claim 5, wherein the configuration for the at least one SSB synchronization session comprises at least one of:
    a scheduling time, wherein the scheduling time is based on a primary cell (Pcell) timing schedule;
    a burst length;
    an indication of a set of burst beams; or
    a number of repetitions of a burst of SSB beams.

9. The apparatus of claim 8, wherein the scheduling time is based on the Pcell timing schedule.

10. The apparatus of claim 5, wherein a number of beams scanned during the at least one SSB synchronization session is based on a set of attributes of at least one of the set of repeaters and the UE.

11. The apparatus of claim 10, wherein the set of attributes comprise at least one of:
    a first indicator of a component type;
    a second indicator of a fixed or nomadic device;

a third indicator of a characteristic of the second set of beams;
a fourth indicator of an installation or a boot up procedure;
a fifth indicator of a SSB synchronization session type;
a sixth indicator of a time gap since a previous SSB synchronization session; or
a seventh indicator of a ray tracing analysis accuracy.

12. The apparatus of claim 1, wherein the set of coarse beam information comprises an indication of a set of receive (Rx) beams and a set of transmit (Tx) beams for each repeater of the set of repeaters, the network node, and the UE.

13. The apparatus of claim 1, wherein the set of refined beam information comprises an indication of a beam direction associated with each beam of the second set of beams.

14. The apparatus of claim 1, wherein the first set of beams comprise a primary cell (Pcell) link.

15. The apparatus of claim 1, wherein the second set of beams comprises a sub-terahertz (Sub Thz) link.

16. The apparatus of claim 1, wherein the set of repeaters comprises a set of access points (APs).

17. A method of wireless communication at a network node, comprising:
transmitting, to at least one of a user equipment (UE) or a set of repeaters via a first set of beams, a first indication of a set of coarse beam information for a second set of beams, wherein the first set of beams comprise a first set of resources in a first frequency range (FR) and the second set of beams comprise a second set of resources in a second FR, wherein the first FR and the second FR do not overlap;
receiving, from at least one of the UE or the set of repeaters via the first set of beams, a second indication of a set of refined beam information for the second set of beams; and
communicate, via at least one repeater of the set of repeaters, with the UE based on the received second indication of the set of refined beam information.

18. The method of claim 17, further comprising:
receiving a third indication of a location of the UE;
receiving a fourth indication of a set of locations associated with the set of repeaters;
performing a ray-tracing analysis based on the third indication of the location of the UE and the fourth indication of the set of locations associated with the set of repeaters; and
generating the set of coarse beam information based on the performed ray-tracing analysis.

19. The method of claim 18, wherein performing the ray-tracing analysis based on the third indication of the location of the UE and the fourth indication of the set of locations associated with the set of repeaters, comprises:
populating a topographic map of a zone based on at least one of the third indication of the location of the UE or the fourth indication of the set of locations associated with the set of repeaters.

20. The method of claim 18, wherein performing the ray-tracing analysis based on the third indication of the location of the UE and the fourth indication of the set of locations associated with the set of repeaters comprises:
identifying a set of line-of-sight directions between at least two of the network node, the UE, and the set of repeaters based on the third indication of the location of the UE and the fourth indication of the set of locations associated with the set of repeaters, wherein the set of coarse beam information comprises a set of coarse beams between the at least two of the network node, the UE, and the set of repeaters.

21. The method of claim 17, further comprising:
transmitting a configuration for at least one synchronization signal block (SSB) synchronization session for each hop on a path between the UE and the network node via the set of repeaters.

22. The method of claim 21, further comprising:
receiving a third indication of at least one of a beam width, an angular direction, a granularity, or a beam vocabulary for each beam of the second set of beams, wherein the configuration of the at least one SSB synchronization session comprises, based on the third indication, at least one of:
a fourth indication of set of transmit (Tx) beams associated with each Tx coarse beam of a set of Tx coarse beams;
a first number of Tx beams associated with each Tx coarse beam of the set of Tx coarse beams; or
a second number of SSB repetitions, wherein the second number of SSB repetitions equals a number of receive (Rx) beams associated with each Rx coarse beam of a set of Rx coarse beams.

23. The method of claim 22, wherein the second number of SSB repetitions is equal to a third number of receive (Rx) beams associated with each Rx coarse beam of the set of Rx coarse beams.

24. The method of claim 21, wherein the configuration for at least one SSB synchronization session comprises at least one of:
a scheduling time, wherein the scheduling time is based on a primary cell (Pcell) timing schedule;
a burst length;
a fifth indication of a set of burst beams; or
a number of repetitions of a burst of SSB beams.

25. The method of claim 24, wherein the scheduling time is based on the Pcell timing schedule.

26. The method of claim 21, wherein a number of beams scanned during at least one SSB synchronization session is based on a set of attributes of at least one of the set of repeaters and the UE.

27. The method of claim 26, wherein the set of attributes comprise at least one of:
a first indicator of a component type;
a second indicator of a fixed or nomadic device;
a third indicator of a characteristic of the second set of beams;
a fourth indicator of an installation or a boot up procedure;
a fifth indicator of a SSB synchronization session type;
a sixth indicator of a time gap since a previous SSB synchronization session; or
a seventh indicator of a ray tracing analysis accuracy.

28. The method of claim 17, wherein the set of coarse beam information comprises a third indication of a set of receive (Rx) beams and a set of transmit (Tx) beams for each repeater of the set of repeaters, the network node, and the UE.

29. The method of claim 17, wherein the set of refined beam information comprises a third indication of a beam direction associated with each beam of the second set of beams.

30. A non-transitory computer-readable medium storing computer executable code at a network node, the code when executed by at least one processor causes the at least one processor to:
transmit, to at least one of a user equipment (UE) or a set of repeaters via a first set of beams, a first indication of a set of coarse beam information for a second set of beams, wherein the first set of beams comprise a first set of resources in a first frequency range (FR) and the second set of beams comprise a second set of resources in a second FR, wherein the first FR and the second FR do not overlap;

receive, from at least one of the UE or the set of repeaters via the first set of beams, a second indication of a set of refined beam information for the second set of beams; and communicate, via at least one repeater of the set of repeaters, with the UE based on the received second indication of the set of refined beam information.

* * * * *